United States Patent [19]

Ichihara et al.

[11] Patent Number: 5,187,694
[45] Date of Patent: Feb. 16, 1993

[54] MAGNETO-OPTICAL RECORDING MEDIUM COMPRISING RECORDING LAYER AND THERMAL BIAS LAYER, AND METHOD FOR RECORDING, ERASING AND OVERWRITING ON THE MEDIUM

[75] Inventors: Katsutarou Ichihara, Tokyo; Hiromichi Kobori, Yokohama, both of Japan

[73] Assignee: Kabushiki Kaisha Toshiba, Kawasaki, Japan

[21] Appl. No.: 885,014

[22] Filed: May 19, 1992

Related U.S. Application Data

[63] Continuation of Ser. No. 637,960, Jan. 9, 1991, abandoned, and a continuation of Ser. No. 233,746, Aug. 19, 1988, abandoned.

[30] Foreign Application Priority Data

Aug. 21, 1987 [JP] Japan .................. 62-207537
Jun. 9, 1988 [JP] Japan .................. 63-140468

[51] Int. Cl.⁵ .................. G11B 13/04; G11B 11/12; G11B 11/10
[52] U.S. Cl. .................. 369/13; 360/59; 360/114
[58] Field of Search .................. 369/13, 288, 275.4; 360/59, 114; 365/122; 428/694, 900

[56] References Cited

U.S. PATENT DOCUMENTS

| 4,649,519 | 3/1987 | Sun et al. | 365/122 |
|---|---|---|---|
| 4,771,347 | 9/1988 | Horimai et al. | 360/59 |
| 4,794,560 | 12/1988 | Bell et al. | 360/59 |
| 4,807,204 | 2/1989 | Mizutani et al. | 369/13 |
| 4,825,428 | 4/1989 | Toki | 365/122 |

FOREIGN PATENT DOCUMENTS

| 0180459 | 7/1986 | European Pat. Off. . |
|---|---|---|
| 0217067 | 8/1987 | European Pat. Off. . |
| 62-154347 | 7/1987 | Japan . |
| 62-175948 | 8/1987 | Japan . |

OTHER PUBLICATIONS

"Single Beam Overwrite Method Using Multilayered Magneto-Optical Medium" by M. Sato et al p. 721 (28p-ZL-3).

Primary Examiner—Hoa Nguyen
Attorney, Agent, or Firm—Oblon, Spivak, McClelland, Maier & Neustadt

[57] ABSTRACT

A magneto-optical information storage medium includes a substrate, a recording layer formed on the substrate and having an axis of easy magnetization extending in the direction perpendicular to its surface, a nonmagnetic layer formed on the recording layer, and a bias layer, formed on the nonmagnetic layer, for generating bias magnetic field $H_B(T)$ in accordance with a temperature. The magnetization of the recording layer is reversed by bias magnetic field $H_B(T)$ in first and second magnetization reversal temperature regions $T_W$ and $T_E$ ($T_W > T_E$). Information is recorded on such a magneto-optical information storage medium by radiating a first laser beam having a first power level for heating an irradiated portion to a temperature in region $T_W$. In addition, information erasing is performed by radiating a second laser beam having a second power level which is lower than the first power level and heats an irradiated portion to a temperature in region $T_E$. Overwrite is performed by power-modulating between the first and second power levels and radiating the modulated laser beam onto a previously recorded area of the medium.

12 Claims, 5 Drawing Sheets

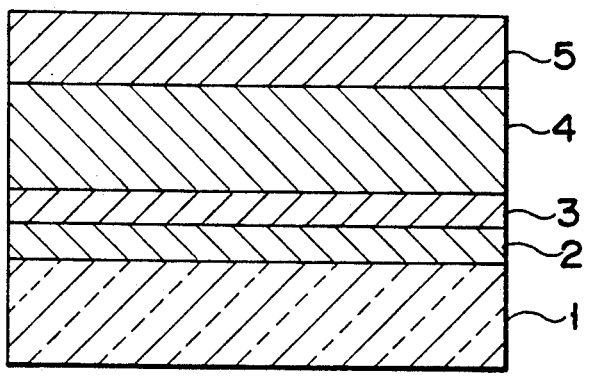
F I G. 1
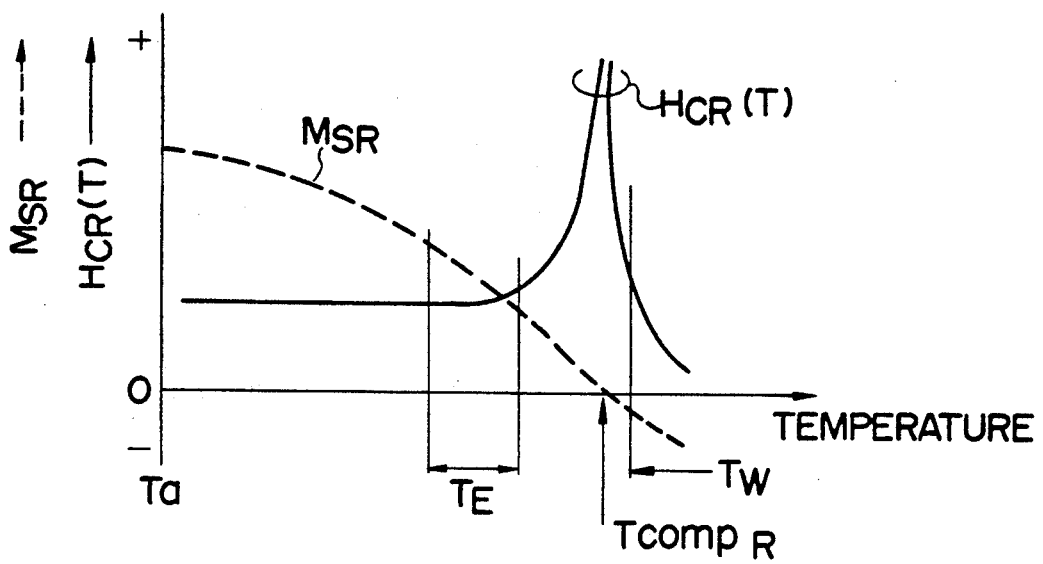
F I G. 2A
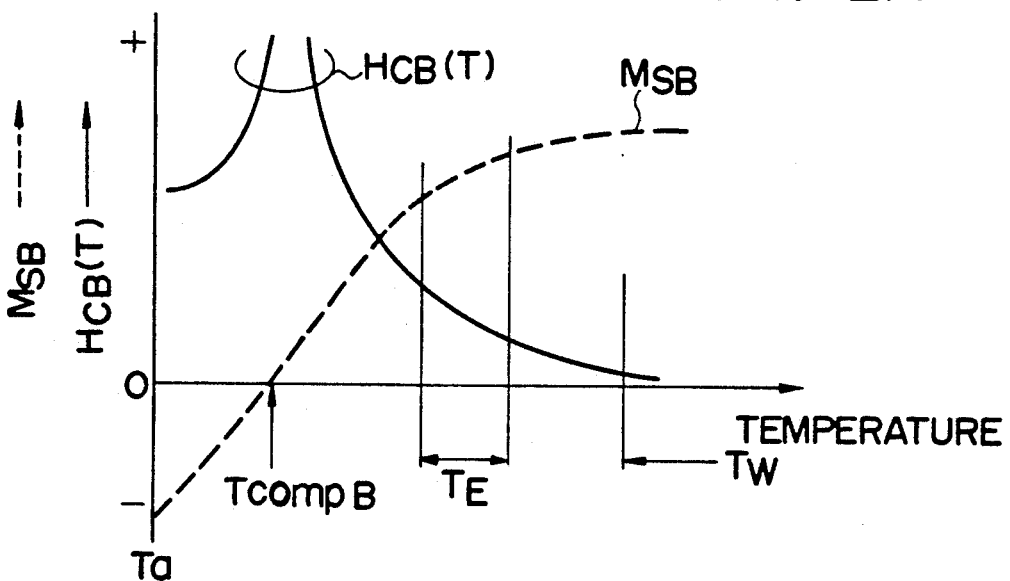
F I G. 2B

FIG. 3A  T=Ta
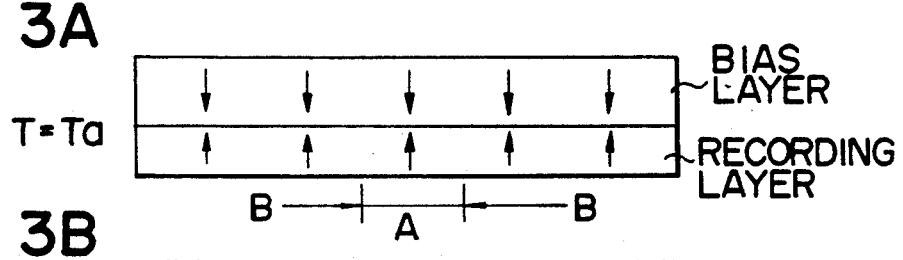
FIG. 3B  $Tcomp_R < T < T_W$
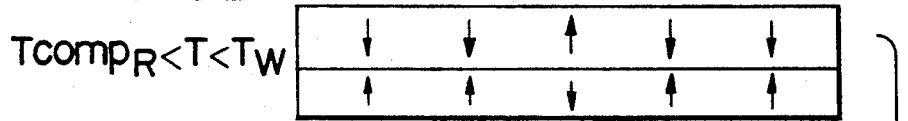
FIG. 3C  $T = T_W$
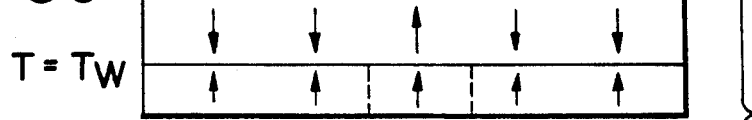
FIG. 3D  $Tcomp_B < T < Tcomp_R$
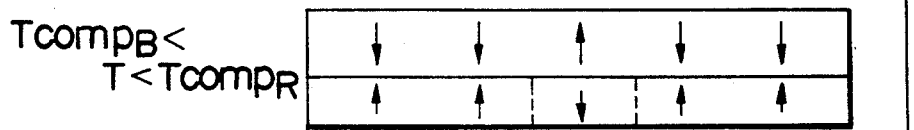
FIG. 3E  $Ta \leq T < Tcomp_B$
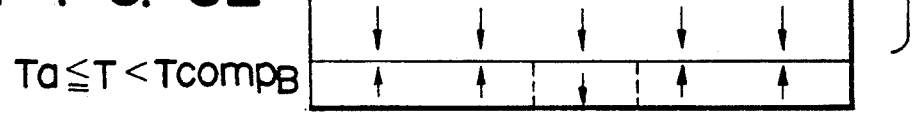
FIG. 3F  $T = T_E$
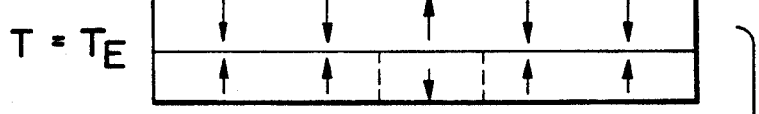
FIG. 3G  $T = T_E$
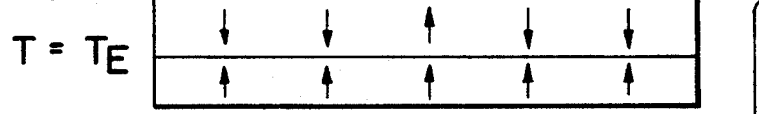
FIG. 3H  $T = Ta$
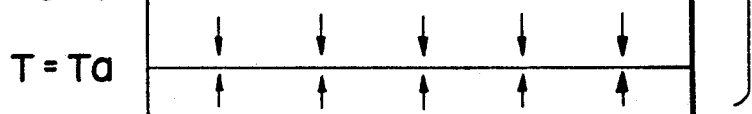

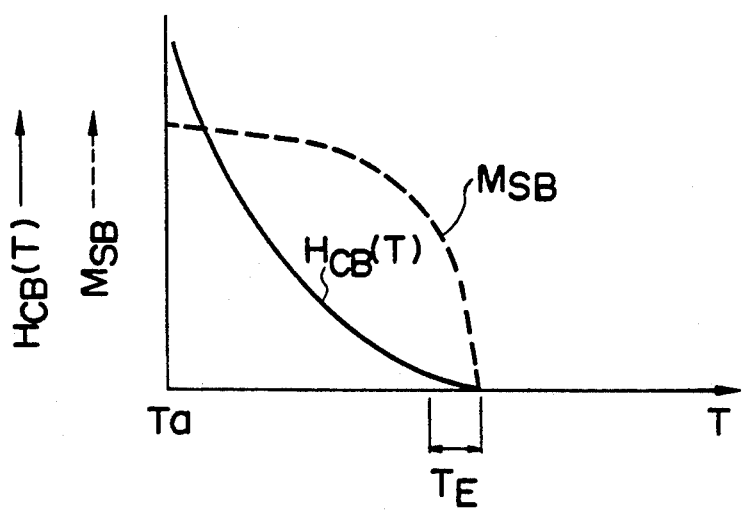
F I G. 6
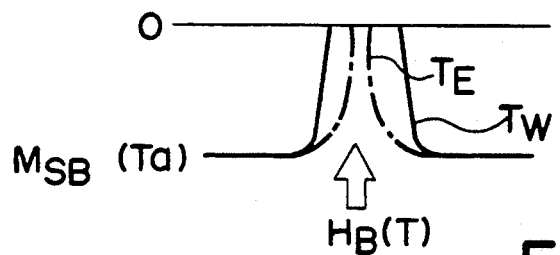
F I G. 7
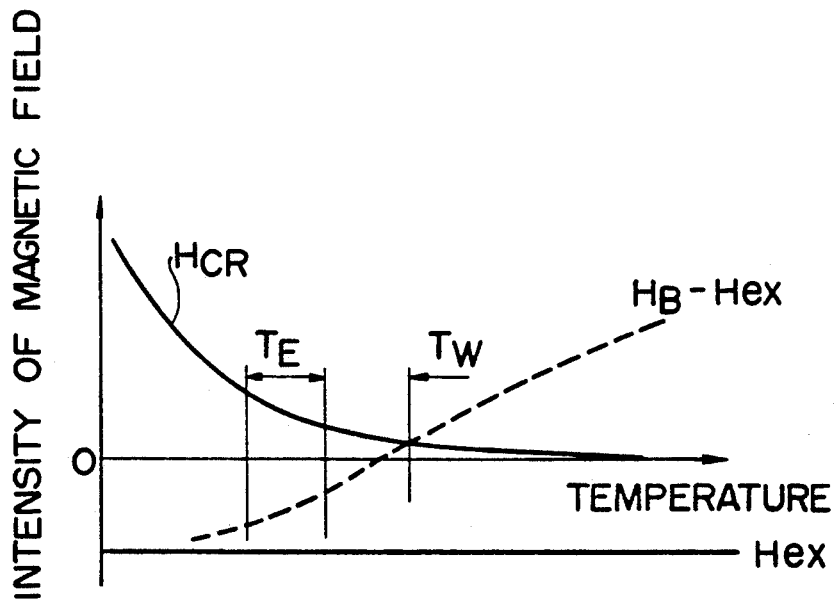
F I G. 8

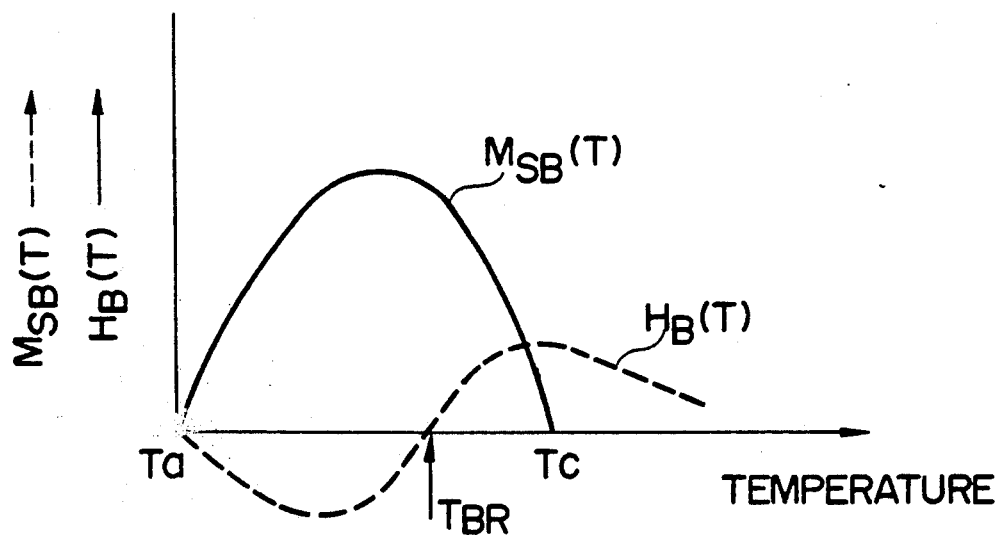
F I G. 9
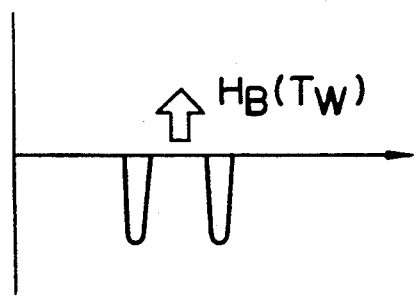
F I G. 10A
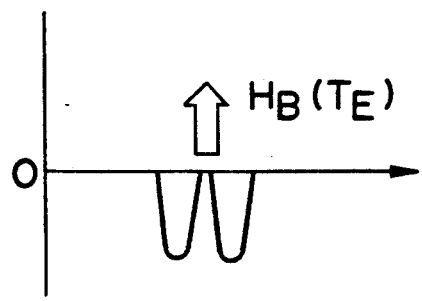
F I G. 10B

MAGNETO-OPTICAL RECORDING MEDIUM COMPRISING RECORDING LAYER AND THERMAL BIAS LAYER, AND METHOD FOR RECORDING, ERASING AND OVERWRITING ON THE MEDIUM

This application is a continuation of application Ser. Nos. 07/637,960, filed on Jan. 9, 1991, and 07/233,746 filed on Aug. 19, 1988, now abandoned.

BACKGROUND OF THE INVENTION

1. Field of the Invention

The present invention relates to a magneto-optical information storage medium comprising a bias layer for applying a bias magnetic field, which is necessary for recording and erasing information on/from a recording layer, to the recording layer, and a method for recording and erasing information thereto and therefrom.

2. Description of the Related Art

In a magneto-optical recording system, information is recorded/reproduced by using an information storage medium comprising a recording layer formed of a magnetic film having an axis of easy magnetization in a direction perpendicular to its surface. According to this system, information is recorded by reversing the magnetization upon radiation of a laser beam and application of a magnetic field. The recorded information is reproduced by detecting the direction of the magnetization of the recording layer utilizing a magneto-optical effect such as the polar Kerr effect. In comparison with a normal magnetic recording system, the magneto-optical recording system is superior in non-contact accessability and compatibility of media. In addition, the magneto-optical recording system can increase a recording density higher than the magnetic recording system. The magneto-optical recording system, however, has a limitation based on the principle of the system itself. That is, when recorded information is to be rewritten, the previously recorded information must be erased first. For this reason, in the magneto-optical recording system, it is considered that direct information rewriting by overwrite is difficult.

Recently, various proposals have been made in order to enable direct overwrite in a magneto-optical recording system. For example, U.S. patent application Ser. No. 649,519, discloses a system wherein a magneto-optical information storage medium comprises a temperature-dependent bias layer adjacent to a recording layer so that magnetization reversal of the recording layer is performed in a reversible manner by using a bias magnetic field from the bias layer.

The bias layer described in this patent has a compensation temperature lower than the Curie temperature of the recording layer, and has a Curie temperature higher than the Curie temperature of the recording layer. In this magneto-optical information storage medium, the directions of magnetization of the recording and bias layers are the same, e.g., a downward direction prior to recording (after initialization or erasing).

When a laser beam is radiated onto the recording layer in this state, thus the temperature of a magnetic domain where the laser beam is radiated reaches the Curie temperature, the magnetization of the magnetic domain is eliminated. Then, if the temperature of a magnetic domain of a bias layer corresponding to this magnetic domain exceeds the compensation temperature, the direction of the magnetization of the magnetic domain of the above-described recording layer is reversed upward.

After this operation, when radiation of the laser beam is stopped, the recording and bias layers are cooled, and first, the magnetic domain of the recording layer is magnetized in the direction opposite to that before recording upon magnetization of the corresponding magnetic domain of the bias layer (i.e., upward). Subsequently, when the temperature of the magnetic domain of the bias layer becomes lower than the compensation temperature with a decrease in temperature of the recording and bias layers, the magnetization of the magnetic domain of the bias layer is temporarily reversed downward. However, since the bias layer is formed of a material exhibiting a sufficiently small coercive force near room temperature, its magnetization is reversed upward by magnetization of the recording layer.

When recorded information is to be erased, a laser beam is radiated onto only a magnetic domain where the information is recorded. The magnetization of the magnetic domain of the bias layer is reversed downward by heating the magnetic domain of the recording layer to the neighborhood of the Curie temperature. Then, when radiation of the erase laser beam is stopped, the magnetization of the magnetic domain of the recording layer is reversed downward by magnetization of the corresponding magnetic domain of the bias layer.

In this method, the magnetization of the recording layer is reversed by a laser beam having the same energy in both recording and erasing operations. For this reason, in the erasing operation, the magnetization of the bias layer must be directed to its original direction by radiating only a magnetic domain where information is recorded. Therefore, when overwrite is to be performed, previously recorded information is read, and then an overwrite beam must be radiated on the basis of the readout information.

In order to perform such control, two independent laser beams must be used such that while a magnetic domain where the information is previously recorded is detected by using a first laser beam, a second laser beam for recording/erasing is controlled.

However, it is difficult to perform such control with high precision. In addition, when such control is to be performed, an information erasing operation becomes extremely complicated. Two systems are employed as those using two laser beams, i.e., a two-head/two-beam system wherein two beams are generated by independent semiconductor lasers and a one-head/two-beam system wherein two beams are generated by one semiconductor laser. The former has a problem of high cost, whereas the latter has problems that the manufacture of a semiconductor laser as a laser beam source is difficult and the arrangement of its optical system is complicated.

A technique of realizing high-speed overwrite by using a one-head/one-beam system without posing the above-described problems is disclosed in Extended abstract (The 34th Spring meeting 1987), The Japan Society of Applied Physics and related societies; Saito et al. 28p-ZL-3, and Japanese Patent Disclosure (Kokai) No. 62-175948. According to this technique, a permanent magnet for generating a magnetizing strong magnetic field is arranged at a previous portion of a radiation position of a laser beam, and high-speed overwrite of a two-layered magneto-optical information storage medium is performed by power modulation of light beam.

In this method, however, since a large permanent magnet for generating a strong magnetic field is used, the size of an apparatus is inevitably increased, and besides, an electromagnetic drive system for tracking and focusing in an optical head is adversely influenced by leaking magnetic fields of the magnet.

SUMMARY OF THE INVENTION

The present invention has been made to solve the above-described conventional drawbacks, and has as its object to provide a magneto-optical information storage medium which can easily erase information and realize high-speed overwrite by using a one-head/one-beam type laser beam source without using a large magnet for generating a strong magnetic field, and a method for recording and erasing information thereto and therefrom.

A magneto-optical information storage medium according to the present invention comprises a recording layer for recording information, having an axis of easy magnetization extending in a direction perpendicular to a surface thereof, and a bias layer for applying a bias magnetic field $H_B(T)$, which is changed in accordance with a temperature, to the recording layer. Magnetization of the recording layer is reversed upon application of bias magnetization $H_B(T)$ in first and second magnetization reversal temperature regions $T_W$ and $T_E$ ($T_W > T_E$), and is oriented in a direction of bias magnetic field $H_B(T)$.

In this case, the bias magnetic field $H_B(T)$ is a leaking magnetic field generated from the distribution of magnetization $M_{SB}$ of the bias layer generated in its laser beam irradiated area. Therefore, the feature that the magnetization of the recording layer is oriented in the direction of the magnetization of bias magnetic field $H_B(T)$ in the present invention is different from the feature that the magnetization of the recording layer is oriented in the direction of magnetization $M_{SB}$ of the bias layer as described in in U.S. Pat. No. 4,649,519. As described above, since bias magnetic field $H_B(T)$ means a leaking magnetic field the present invention essentially differs from the technique disclosed in Japanese Patent Disclosure (Kokai) No. 62-175948, wherein overwrite is performed on the basis of an exchange force due to an interfacial domain wall.

In the present invention, the recording layer preferably has compensation temperature $T_{compR}$. In this case, the magneto-optical information storage medium is composed such that first magnetization reversal temperature $T_W$ is present in a region higher than compensation temperature $T_{compR}$, and second magnetization reversal temperature $T_E$ in a region lower than compensation temperature $T_{compR}$.

According to a method for recording information of the present invention, information is recorded by radiating a first laser beam having a first power level for heating an irradiated portion to a temperature of first magnetization reversal temperature region $T_W$, and information is erased by radiating a second laser beam having a second power level for heating an irradiated portion to a temperature of second magnetization reversal temperature region $T_E$. Overwrite is performed by power-modulating the laser beams having the first and second power levels.

In first and second magnetization reversal temperature regions $T_W$ and $T_E$, recording, erasing, and overwrite can be performed by applying external magnetic field Hex satisfying the following inequality to the magneto-optical information storage medium in addition to the laser beams described above, as needed:

$$H_{CR}(T) \leq H_B(T) + H_{ex}$$

wherein $H_{CR}(T)$ is the coercive force of the recording layer.

As described above, according to the present invention, a magneto-optical information storage medium is used, wherein the magnetization of the recording layer is reversed in first and second magnetization reversal temperature regions $T_W$ and $T_E$ ($T_W > T_E$), and is oriented in the direction of bias magnetic field $H_B(T)$ applied from the bias layer. Accordingly, overwrite is performed by power-modulating the recording and erasing laser beams having the first and second power levels for heating an irradiated portion to temperatures in first and second magnetization reversal temperature regions $T_W$ and $T_E$, respectively. Therefore, in an overwrite operation, a laser beam for detecting a magnetic domain where information is previously recorded can be omitted. High-speed overwrite can be realized by using a laser beam source of a one-head/one-beam system with a simple arrangement, and information can be easily erased.

Moreover, in recording and erasing of information, since an external magnetic field is not necessary, or even if it is necessary, this external magnetic field has only an auxiliary function, therefor, it is sufficient to provide a small external magnetic field generator for generating a magnetic field as weak as several hundreds Oe. Therefore, a small information recording apparatus can be realized, and the adverse influences on the servo electromagnetic drive system in the optical head can be prevented.

BRIEF DESCRIPTION OF THE DRAWINGS

FIG. 1 is a sectional view illustrating a magneto-optical information storage medium according to an embodiment of the present invention;

FIGS. 2A and 2B are graphs respectively showing the thermomagnetic characteristics of recording and bias layers in FIG. 1;

FIGS. 3A to 3H are views illustrating the directions of magnetization of laser beam irradiated portion A and non-irradiated portion B of the bias and recording layers at various temperatures;

FIG. 6 is a graph showing another thermomagnetic characteristic of the bias layer;

FIG. 7 is a graph showing another magnetization distribution of the bias layer;

FIG. 8 is a graph for explaining operations of recording and erasing information on/from a recording layer having no compensation temperature;

FIG. 9 is a graph showing changes in magnetization and bias magnetic field of the bias layer in another embodiment as a function of temperature;

FIG. 10A is a graph showing a magnetization distribution of the bias layer at a recording temperature when the bias layer shown in FIG. 9 is used; and FIG. 10B is a graph showing a magnetization distribution at an erase temperature when the bias layer shown in FIG. 9 is used.

DETAILED DESCRIPTION OF THE PREFERRED EMBODIMENT

Figure 4:
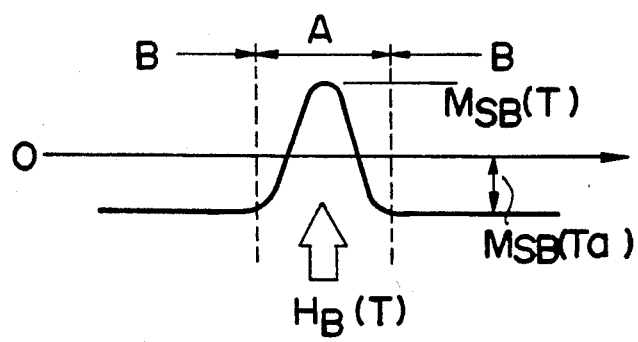
FIG. 4 is a graph showing a magnetization distribution of the bias layer.

The present invention will be described below with reference to the accompanying drawings. FIG. 1 is a sectional view illustrating a magneto-optical information storage medium according to an embodiment of the present invention. Substrate 1 is composed of glass, polycarbonate, or the like, and comprises a dielectric layer in its surface region as needed. Recording layer 2, nonmagnetic layer 3, bias layer 4, and protective layer 5 are sequentially formed on substrate 1 in this order. These layers can be properly formed by, e.g., sputtering.

Recording layer 2 is made of a magnetic material, having an axis of easy magnetization extending in the direction perpendicular to its surface, e.g., a rare earth-transition metal alloy. As a rare earth-transition metal alloy constituting recording layer 2, a heavy rare earth-transition metal alloy such as GdTbCo and GdTbFe is preferable. In addition, an alloy having compensation temperature $T_{comp}$ is preferable. When a rare earth-transition metal alloy having compensation temperature $T_{comp}$ is used as the recording layer, RE-rich RE-TM alloy is preferably used. The coercive force of this alloy is precipitously decreased at temperature above compensation temperature $T_{comp}$ with an increase in temperature.

Bias layer 4 exhibits a uniform magnetization distribution at a retention temperature (room temperature $T_a$), and hence a magnetic field is not generated outside the layer. When the temperature of bias layer 4 exceeds room temperature $T_a$, bias magnetic field $H_B(T)$ is generated by bias layer 4, and extends therefrom. That is, when a laser beam is radiated onto a medium and the temperature of the irradiated portion is increased, a laser beam irradiated area of bias layer 4 forms a magnetization distribution different from that of a laser beam nonirradiated area in accordance with the power of the laser beam (i.e., in accordance with a temperature). As a result, bias magnetic field $H_B(T)$ due to this magnetization distribution is generated and extends from bias layer 4. Therefore, the intensity of the bias magnetic field can be controlled in accordance with the power level of a laser beam, and the bias magnetic field controlled in this manner can be applied to recording layer 2. As a material for bias layer 4, any magnetic material having the above-described function can be used. However, similar to recording layer 2, a rare earth-transition metal alloy is preferably used.

The medium is irradiated with a first laser beam and is heated to a temperature in a predetermined temperature range ($T_W$). As a result, a bias magnetic field is generated by the laser beam irradiated area of bias layer 4 and is applied to recording layer 2 while an external magnetic field is applied thereto as needed. With this operation, the magnetization of the irradiated area of recording layer 2 is reversed to the direction of a magnetic field generated by bias layer 4, thereby writing information. In addition, the medium is irradiated with a second laser beam having a power lower than that of the first laser beam and is heated to a temperature in a temperature region ($T_E$) lower than $T_W$. As a result, a bias magnetic field is generated by the irradiated area of bias layer 4 and is applied to recording layer 2 while an external magnetic field is applied thereto as needed. With this operation, the magnetization of a previously recorded area of recording layer 2 is reversed to the direction of the bias magnetic field, thereby erasing information.

Bias magnetic field $H_B(T)$ is oriented in substantially the same direction in both the radiation modes of the first and second laser beams (recording and erasing modes) independently of whether or not bias layer 4 has compensation temperature $T_{compB}$.

When recording layer 2 has compensation temperature $T_{compR}$, a recording temperature (first magnetization reversal temperature) is set to be higher than compensation temperature $T_{compR}$, whereas an erasing temperature (second magnetization reversal temperature) is set to lower than compensation temperature $T_{compR}$. The directions of spontaneous magnetization of recording layer 2 at the recording and erasing temperatures are opposite to each other. Since the direction of bias magnetic field $H_B(T)$ applied from bias layer 4 is constant, a reversal magnetic domain is formed at the recording temperature and information is recorded, whereas a reversal magnetic domain is eliminated at the erasing temperature and information is erased. Therefore, in this case, an external magnetic field is not necessarily required.

When recording layer 2 does not have a compensation temperature, in order to record and erase information, an external magnetic field having an intensity intermediate between the intensities of bias magnetic fields at the recording and erasing temperatures is applied to the medium.

As described above, neither of recording and bias layers 2 and 4 need have a compensation temperature. In addition, the recording temperature need not be set near the Curie temperature of recording layer 2. It is only required that the coercive force of recording layer 2 be smaller than bias magnetic field $H_B(T)$ or the vector sum of bias magnetic field $H_B(T)$ and external magnetic field $H_{ex}$. In addition, bias layer 4 need not have a Curie temperature between room temperature and the recording temperature. Therefore, materials and compositions for both recording and bias layers 2 and 4 have a wide selection range.

As described above, since bias layer 4 is only required to be heated and generate a bias magnetic field upon radiation of a laser beam, bias layer 4 need not form a reversal magnetic domain unlike recording layer 2. Therefore, bias layer 4 may be constituted by a thick film of Co based alloy having a low magnetization reversal sensitivity.

In laser beam radiating and cooling operations, the temperatures of recording and bias layers 2 and 4 may or may not be equal to each other. When the temperatures are equal to each other or have only a small difference, in the cooling process after radiation of the first laser beam, the temperature of recording layer 2 passes through second magnetization reversal temperature region $T_E$ (erasing temperature region) together with the temperature of bias layer 4, and hence it may be considered that reversal of the magnetization occurs again. However, it generally takes only about a few 10 nsec to pass through this region. This period of time is short compared with a time required for a domain wall to be moved until the diameter of a magnetic domain reaches that of a corresponding laser beam. Therefore, even if a nucleus for magnetization re-reversal is formed, it is unstable and disappears. Even if it is left, it substantially does not decrease a reproduction signal, and hence no practical problem is posed.

Bias layer 4 preferably has a film thickness allowing a sufficient bias magnetic field to be applied from bias layer 4 to recording layer 2 and allowing bias layer 4 to be sufficiently heated by radiation of a laser beam. Concretely, it is preferably 500 to 5,000 Å and, more preferably, 1,000 to 4000 Å.

It is preferable that recording layer 2 is thin enough to prevent a leakage of a magnetic field to bias layer 4 during the overwrite operation. It is also preferable that layer 2 is thin enough to allow the laser beam to reach bias layer 4 in the preferred embodiment wherein the laser beam is incident on recording 2. In addition, when recording layer 2 is formed by sputtering or the like, it is preferable that layer 2 has a thickness of 100 Å or more to have sufficiently perpendicular magnetic anisotropy. In view of these conditions, the thickness of recording layer 2 is preferably set to 100 to 500 Å and, more preferably, 100 to 300 Å.

When maximum magnetization of bias layer 4 occurs at the temperatures between room temperature $T_a$ and the recording temperature, the directions of bias magnetic field $H_B(T)$ in the central and peripheral areas in a laser beam spot may become opposite to each other. In this case, too, the magnetization of the recording layer can be reversed using bias magnetic field $H_B(T)$ by adjusting the power of the laser beam, and adjusting the film thickness, the material, and the like of non-magnetic layer 3 (to be described in detail later) between recording and bias layers 2 and 4.

Nonmagnetic layer 3 has a function of preventing an exchange force from being generated between recording and bias layers 2 and 4. That is, in the present invention, it is preferable that recording and bias layers 2 and 4 be arranged without an exchange force formed therebetween, unlike the above-described conventional invention disclosed in Japanese Patent Disclosure (Kokai) No. 62-175989, wherein the magnetization of the bias layer is transferred onto the recording layer to reverse the magnetization of the recording layer. Therefore, nonmagnetic layer 3 is formed to eliminate this exchange force.

In addition to the above function, nonmagnetic layer 3 may also have a function of thermally insulating recording and bias layers 2 and 4. When the temperatures of recording and bias layers 2 and 4 are equal to each other or have a small difference in the cooling process, slight magnetization re-reversal may occur in the cooling process, as described above. However, since nonmagnetic layer 3 has the heat insulating function, a difference in temperature is caused between recording and bias layers 2 and 4, and hence magnetization reversal of a recording bit in the cooling process can be completely prevented.

When nonmagnetic layer 3 is required to have both the exchange force eliminating and heat insulating functions, layer 3 is preferably made of SiO, $SiO_2$, $Si_3N_4$, AlN, $Al_2O_3$, $TiO_2$, or the like. When the heat insulating function is not required, layer 3 may be made of a metal film consisting of Al, Ti, $T_a$, Ag, or Cu.

The film thickness of nonmagnetic layer 3 may be set to be several Å if only an exchange force is to be eliminated. However, if the heat insulating function is also required, a film thickness of 50 to 4,000 Å is preferable with the above-described materials. The optimal film thickness of nonmagnetic layer 3 is determined for each material to be used in consideration of the intensity of a bias magnetic field, a Kerr enhancement function in reproduction, and the like.

It is preferable that nonmagnetic layer 3 be formed. However, nonmagnetic layer 3 need not be formed, if the exchange force resulting from the exchange-coupling between recording and bias layers 2 and 4 has a value sufficiently smaller than the bias magnetic field. When nonmagnetic layer 3 is made of a transparent material, bias layer 4 functions as a reflecting layer, and can amplify a reproduction signal.

Protective layer 5 is made of, e.g., a dielectric material, and has a function of protecting recording and bias layers 2 and 4.

When information is to be recorded on the magneto-optical information storage medium arranged in the above-described manner, the medium is irradiated with a laser beam having the first power level modulated by an information signal. Then, a bias magnetic field is generated by a laser beam irradiated portion of bias layer 4 in accordance with its temperature, and is applied to recording layer 2. Upon radiation of this laser beam, recording layer 2 is heated to a temperature in first magnetization reversal temperature region $T_W$ serving as the recording temperature region. In this case, the magnetization of a laser beam irradiated area of recording layer 2 is reversed to the direction of a magnetic field generated by the bias layer, by using only the bias magnetic field from bias layer 4, or by using, as needed, both the bias magnetic field and an external magnetic field.

When recorded information is to be erased, a previously recorded area of the medium is irradiated with a laser beam having the second power level lower than the first power level. As a result, a bias magnetic field is generated by a laser beam irradiated portion of bias layer 4 in accordance with its temperature, and is applied to recording layer 2. In addition, upon radiation of this laser beam, a laser beam irradiated area of recording layer 2 is heated to a temperature in second magnetization reversal temperature region $T_E$ serving as the erasing temperature region. In this case, the magnetization of the laser beam irradiated area of recording layer 2 is reversed to the direction of a magnetic field generated from the bias layer by using only the bias magnetic field from bias layer 4, or by using, as needed, both the bias magnetic field and an external magnetic field. That is, the magnetization of the previously recorded area of recording layer 2 is reversed and returned to the state before recording.

When overwrite is to be performed, while an erasing operation is performed by irradiating areas to be overwritten with a laser beam having the second power level, a laser beam having the first power level is radiated onto an area, where a new recording bit is formed, of these areas, thereby performing overwrite. That is, overwrite is realized by radiating a laser beam which is power-modulated between the first and second power levels in accordance with an information signal to be newly recorded.

Recording and erasing operations of the magneto-optical information storage medium according to the present invention will be described further in detail. FIGS. 2A and 2B are graphs showing the thermomagnetic characteristics of recording and bias layers 2 and 4, i.e., a relationship between a temperature, and a coercive force ($H_C$) and magnetization ($M_S$). Referring to FIGS. 2A and 2B, reference symbol $H_{CR}(T)$ denotes the coercive force of recording layer 2; $M_{SR}$, the magnetization of recording layer 2; $H_{CB}(T)$, the coercive force of bias layer 4; $M_{SB}$, the magnetization of bias layer 4; $T_a$, the retention temperature (room temperature) of the medium; $T_{compR}$, the compensation temperature of recording layer 2; and $T_{compB}$, the compensation temperature of bias layer 4. Note that a GdTbCo layer and the like can be used for the recording layer having such characteristics and a TbCo layer and the like can be used for the bias layer having such characteristics.

FIGS. 3A to 3H are views illustrating the directions of magnetization of the magneto-optical storage medium comprising recording and bias layers 2 and 4 having such thermomagnetic characteristics in the recording and erasing processes, wherein only recording and bias layers 2 and 4 are extracted and drawn. Referring to FIG. 3A, reference symbol A denotes a laser beam irradiated area; and B, a laser beam nonirradiated area. FIG. 3A shows the initial state of magnetization of recording and bias layers 2 and 4. In order to form such a magnetization state, when, for example, coercive forces $H_{CR}(T_a)$ and $H_{CB}(T_a)$ of recording and bias layers 2 and 4 at room temperature $T_a$ satisfy $H_{CR}(T_a) < H_{CB}(T_a)$, high magnetic field $H_{ex1}$ satisfying $H_{CB}(T_a) < H_{ex1}$ is applied downward, and then, magnetizing magnetic field $H_{ex2}$ satisfying $H_{CR}(T_a) < H_{ex2} < H_{CB}(T_a)$ is applied upward.

When a recording laser beam having the first power level is radiated onto area A through substrate 1 the magnetization of a laser beam irradiated area of bias layer 4 is changed into a value differing from that of a nonirradiated area, and then becomes substantially equivalent to a state wherein a small magnet is placed in irradiated area A. As shown in FIG. 4, bias magnetic field $H_B(T)$ generated by the above magnetization is directed upward throughout a temperature region satisfying $T_a < T$. Bias magnetic field $H_B(T)$ is then applied to recording layer 2.

The intensity of bias magnetic field $H_B(T)$ depends on a vector difference between magnetization $M_{SB}(T_a)$ of laser beam nonirradiated area B of bias layer 4 and magnetization $M_{SB}(T)$ of a central portion of irradiated area A, and is increased as a value of $|M_{SB}(T) - M_{SB}(T_a)|$ increased. That is, the value of $H_B(T)$ can be controlled by the temperature of a laser beam irradiated portion. The intensity of $H_B(T)$ is set so as to satisfy a condition of $H_B(T) + H_{ex} > H_{CR}(T)$ in recording temperature region $T_W$ and erasing temperature region $T_E$ in FIGS. 2A and 2B. External magnetic field $H_{ex}$ is oriented in the same direction as bias magnetic field $H_B(T)$, and has a constant intensity. External magnetic field $H_{ex}$ can be omitted if bias magnetic field $H_B(T)$ is sufficiently large.

When temperature T of laser beam irradiated area A reaches a temperature in the range of $T_{compR} < T < T_W$ upon radiation of a recording laser beam having the first power level, as shown in FIG. 3B, each spontaneous magnetization of recording and bias layers 2 and 4 in area A is oriented in the direction opposite to that of areas B. At this temperature, coercive force $H_{CR}(T)$ of recording layer 2 is not still sufficiently lowered, and hence $H_B(T) + H_{ex} < H_{CR}(T)$, and magnetization reversal of area A of recording layer 2 does not occur.

When temperature T of area A rises and reaches the range of $T_W$, as shown in FIG. 3C, the magnetization of laser beam irradiated area A of recording layer 2 is reversed, and domain walls indicated by broken lines are formed between area A and areas B. If radiation of the laser beam is stopped in this state, or area A is relatively moved from the laser beam spot, cooling of area A is started.

When temperature T of area A is cooled to a temperature in the range of $T_{compB} < T < T_{compR}$, since temperature T passes through compensation temperature $T_{compR}$ of recording layer 2 in the cooling process, the magnetization of area A of recording layer 2 is reversed and a recording bit is formed, as shown in FIG. 3D.

When area A is further cooled to a temperature in the range of $T_a \leq T < T_{compB}$, since temperature T passes through compensation temperature $T_{compB}$ of bias layer 4, the magnetization of area A of bias layer 4 is reversed, and the magnetization state of bias layer 4 becomes equivalent to its initial state. With the above-described steps, information is recorded.

An erasing process will be described below. When area A is irradiated with an erasing laser beam having the second power level lower than the first power level, and both the temperatures of recording and bias layers 2 and 4 fall within the range of $T_E$, i.e., during interval $t_E$ in FIG. 5B, a condition of $H_B(T_E) + H_{ex} > H_{CR}(T_E)$ is satisfied. Therefore, when an erasing laser beam is radiated onto area A, first, the magnetization of area A of bias layer 4 is reversed as shown in FIG. 3F. Then, as shown in FIG. 3G, the magnetization of area A of recording layer 2 is reversed by bias magnetic field $H_B(T_E)$ generated by bias layer 4 and is oriented in the direction of bias magnetic field $H_B(T_E)$, thereby erasing information.

When area A is cooled to room temperature $T_a$, since its temperature passes through compensation temperature $T_{compB}$ of bias layer 4 in the cooling process, the magnetization of area A of bias layer 4 is reversed. Then, the states of magnetization of recording and bias layers 2 and 4 are returned to the initial states, respectively, as shown in FIG. 3H.

Figure 5A:
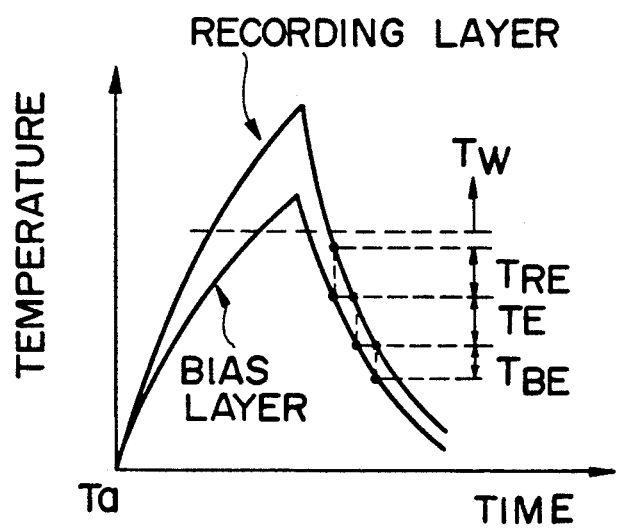
FIG. 5A is a graph showing changes in temperature of the recording and bias layers in information recording.
Figure 5B:
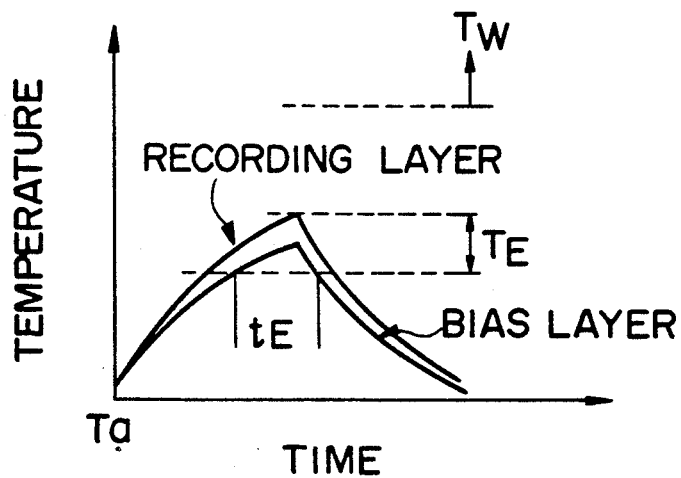
FIG. 5B is a graph showing changes in temperature of the recording and bias layers in information erasing.

In the cooling process upon radiation of the recording laser beam having the first power level, the temperatures of areas A of recording and bias layers 2 and 4 pass through erasing temperature region $T_E$. As described above, formation of nonmagnetic layer 3 having a proper heat insulating function can prevent both the temperatures of areas A of recording and bias layers 2 and 4 from simultaneously passing through erasing temperature region $T_E$. More specifically, as shown in FIG. 5A, the temperature of area A of recording layer 2 is kept in a temperature region higher than erasing temperature region $T_E$, i.e., in a temperature region $T_{RE}$ where a condition of $H_B(T_E) + H_{ex} < H_{CR}(T_{RE})$ is satisfied when the temperature of bias layer 4 passes through erasing temperature region $T_E$. The temperature of area A of bias layer 4 is kept in a temperature region lower than erasing temperature region $T_E$, i.e., in temperature region $T_{BE}$ where a condition of $H_B(T_{BE}) + H_{ex} < H_{CR}(T_E)$ is satisfied. With this arrangement, it can be prevented that the magnetization of a recording bit is re-reversed in the cooling process upon radiation of the recording laser beam.

Assume that there is an interval when the temperatures of areas A of recording and bias layers 2 and 4 simultaneously pass through erasing temperature region $T_E$. As described above, if this interval is sufficiently short, only a nucleus of re-reversal magnetic domain is formed, and hence a reproduction signal is scarcely influenced.

Since a period of time when the temperatures of areas A of recording and bias layers 2 and 4 are simultaneously kept in erasing temperature region $T_E$ is very long compared with a time of the cooling process in recording, the magnetization of a recording bit can be reversed and recorded information can be completely erased.

Since the above-described information recording and erasing operations can be performed by power-modulating a single laser beam between the two power levels, overwrite can be performed by using a laser beam source of a one-head/one-beam system. Even if external magnetic field $H_{ex}$ is required, since its intensity need not be large, only a small magnet can be used as an external magnetic field generating magnet. In addition, if $H_B(T_E) > H_{CR}(T_E)$ and $H_B(T_W) > H_{CR}(T_W)$, external magnetic field $H_{ex}$ is not necessary.

In information reproduction, when the power level of a reproducing laser beam is set such that temperature T of an irradiated area and erasing temperature region $T_E$ satisfy $T < T_E$, a corresponding recording bit is not erased even if information is reproduced while external magnetic field $H_{ex}$ satisfying a condition of $H_B(T) + H_{ex} > H_{CR}(T)$ $(T = T_E)$ is applied. When a difference in temperature between the areas of recording and bias layers 2 and 4, which have been irradiated with the reproducing laser beam, is present, and the lower temperature is lower than erasing temperature region $T_E$, the recording bit is not erased. For example, if the temperature of the beam-irradiated area of bias layer 4 is below erasing temperature region $T_E$, the temperature of the irradiated area of recording layer 2 may be in erasing temperature region $T_E$.

A case wherein a material having a thermomagnetic characteristic that a Curie temperature is present near an erasing temperature as shown in FIG. 6 is used as bias layer 4 will be described below. In this case, the magnetization value of a laser beam irradiated area of bias layer 4 is decreased, and magnetization distributions indicated by solid lines (in recording) and alternate long and short dashed lines (in erasing) in FIG. 7 are obtained. That is, in both recording and erasing, the magnetization of bias layer 4 exhibits an inverted U-shaped distribution. In this case, at temperature T satisfying $T_a < T$, a bias magnetic field generated by bias layer 4 is always directed upward. Since bias magnetic field $H_B(T)$ is increased as the width of the U-shaped magnetization distribution is narrowed and its depth is increased, the maximum value of $H_B(T)$ is present within the temperature range of $T_E$. When the temperature exceeds $T_E$, the value of $H_B(T)$ is gradually decreased. A TM-rich compositional TbFeCo layer or the like can be used as bias layer 4 having such characteristics.

In this case, recording and erasing operations are performed in the same manner as described above. In addition, overwrite can be performed in the same manner. In this case, since the temperature of a recording laser beam irradiated portion of bias layer 4 passes through the Curie temperature, it is preferable that downward external magnetic field $H_{ex}$ be applied to prevent magnetization reversal of the bias layer due to a small bias magnetic field from recording layer 2.

A case wherein recording layer 2 does not have compensation temperature will be described below. In this case, it is only required that the values of $H_B(T_E)$ and $H_B(T_W)$ be different from each other. More specifically, as shown in FIG. 8, when $H_B(T_E) < H_B(T_W)$, it is required that $H_B(T_E) < H_{ex} < H_B(T_W)$ and external $H_{ex}$ oriented in the direction opposite to $H_B(T)$ be applied on the medium. In this case, an effective magnetic field of $H_B(T_W) - H_{ex}$ is applied upward to recording layer 2 in recording temperature region $T_W$ so that the downward initial magnetization of recording layer 2 is reversed upward and information is recorded. In erasing temperature region $T_E$, an effective magnetic field of $H_{ex} - H_B(T_E)$ is applied downward to recording layer 2, so that the upward magnetization of a recording bit is reversed downward and information is erased. When $H_B(T_E) > H_B(T_W)$, external magnetic field $H_{ex}$ satisfying $H_B(T_E) > H_{ex} > H_B(T_W)$ is applied downward and the initial magnetization of recording layer 2 is directed upward. A transition metal-rich rare earth-transition metal alloy is used as a recording layer having no compensation temperature.

When a material having the maximum value of magnetization between room temperature and a recording temperature, such as compensation-composition TbFeCo, is used as bias layer 4, magnetization $M_{SB}(T)$ and magnetic field $H_B(T)$ of bias layer 4 behave depending on a temperature as shown in FIG. 9. Referring to FIG. 9, reference symbol $T_{BR}$ denotes the temperature of a recording laser beam irradiated area of bias layer 4. In this case, the bias magnetic field acting on the central portion of the irradiated area and the bias magnetic field acting on the peripheral portion of that area extend in the opposite directions. When such a bias layer is used, if a material having coercive force $H_{CR}$ which is sufficiently high at temperatures lower than temperature $T_{BR}$ and is quickly lowered at temperatures higher than temperature $T_{BR}$, such as a GdTbCo alloy containing Gd as a main constituent of rare earth elements, is used as a recording layer, and a proper external magnetic field is applied, overwrite can be performed by adjusting the intensity of the bias magnetic field acting on the central portion of the irradiated area in accordance with recording temperature region $T_W$ and erasing temperature region $T_E$ in a manner as shown in FIGS. 10A and 10B.

When a material having Curie temperature $T_{CR}$ at the working temperature, e.g., GdTbFe, is used as a recording layer, it is preferable that $T_{CR} \geq T_W$ be established.

EXAMPLES

Examples of the present invention will be described below.

Example 1

A 1,000-Å thick SiN protective layer was formed by sputtering on a surface of a glass disk having tracking grooves formed thereon and a diameter of 5.25 inches, thereby obtaining substrate 1 having the disk and the layer. Recording layer 2 of $(Gd_{0.3}Tb_{0.7})_{0.3}Co_{0.7}$, non-magnetic layer 3 of SiN, bias layer 4 of $Tb_{0.24}Co_{0.76}$, and protective layer 4 of SiN were sequentially sputtered and stacked on substrate 1 in the order named to form a magneto-optical information storage medium. In this case, the thicknesses of recording layer 2, non-magnetic layer 3, bias layer 4, and protective layer 5 were respectively set to be 250 Å, 200 Å, 2,000 Å, and 1,000 Å.

Coercive force $H_{CR}(T)$ of recording layer 2 was kept substantially constant at about 1.0 kOe in the range from 20° to 220° C., diverges in the range from 220° to 270° C. (compensation temperature $T_{compR}$ of recording layer 2), was quickly attenuated at temperatures exceeding 270° C., and was dropped to 1.0 kOe or less at 300° C. (refer to FIG. 2A).

Magnetization $M_{SB}$ of bias layer 4 was about 100 G at room temperature, converged on an apparent value of 0 at 100° C. (compensation temperature $T_{compB}$ of the bias layer), and was directed in the opposite direction when the temperature exceeded 100° C. Magnetization $M_{SB}$ of bias layer 4 became 50 G at 180° C., 70 G at 220° C., and 100 G at 300° C. (refer to FIG. 2A).

When a laser beam was radiated onto the medium, the magnetization distribution of bias layer 4 shown in FIG. 4 was obtained. Bias magnetic field $H_B(T)$ was generated due to the magnetization distribution of laser beam irradiated area A of bias layer 4. Bias magnetic field $H_B(T)$ at the center of the laser beam spot was zero at room temperature and was monotonously increased with an increase in temperature. Bias magnetic field $H_B(T)$ was 550 Oe at 180° C., 650 Oe at 220° C., and 750 Oe at 300° C. Bias magnetic field $H_B(T)$ was constantly directed upward regardless of the temperature of bias layer 4. A valley of magnetization was generated in laser beam irradiated area A of recording layer 2, and a magnetic field leaked toward bias layer 4. However, since the thickness of the layer was small, the leaking magnetic field was directed downward and was as small as 90 Oe (prior to magnetization reversal) even at a temperature of 300° C. which was in the recording temperature region.

When information recording and erasing are to be performed, in addition to bias magnetic field $H_B(T)$, external magnetic field $H_{ex}$ of 450 Oe is externally applied to a medium in the same direction as that of bias magnetic field $H_B(T)$. Recording temperature region $T_W$ is set at 280° C. or more where $H_B(T)+H_{ex}>H_{CR}(T)$ is established, and erasing temperature region $T_E$ is at 180° to 230° C. where $H_B(T)+H_{ex}>H_{CR}(T)$ is established. Then, the laser beam powers for recording and erasing are adjusted such that the temperatures of laser beam irradiated areas fall within such temperature ranges.

When recording and erasing were actually performed, a linear speed (a relative laser beam scanning speed) was set at 10 m/sec, a recording laser beam power was set at 8 mW, an erasing laser beam power at 4.5 mW, and external magnetic field $H_{ex}$ was set at 600 Oe, which is slightly larger than the critical value (450 Oe) at the laser beam spot center. As a result, information could be recorded and erased, and a 2-MHz information signal could be overwritten by 1-beam power level modulation on the medium on which a 1-MHz information signal was recorded. In addition, while external magnetic field $H_{ex}$ of 600 Oe was applied, the information was reproduced by radiating a 1.5-mW laser beam. As a result, no change in the recorded information signal was found.

A magneto-optical information storage medium wherein $Tb_{0.2}Co_{0.8}$ was used as bias layer 4 was tested. Although compensation temperature $T_{comp}$ of $Tb_{0.2}Co_{0.8}$ was lower than room temperature, recording, erasing, and overwrite were successfully performed in the same manner as described above by way of the direction of initial magnetization thereof being opposite to that of the $Tb_{0.24}Co_{0.76}$.

Example 2

A magneto-optical information storage medium was formed such that bias layer 4 in Example 1 was replaced with a 2,000-Å thick bias layer consisting of $Tb_{0.18}(Fe_{0.8}Co_{0.2})_{0.82}$, and other layers were formed in the same manner as in Example 1. In this case, bias layer 4 exhibited the thermomagnetic characteristic as shown in FIG. 6. More specifically, the magnetization value of bias layer 4 was about 250 G at room temperature, was gradually decreased at first with an increase in temperature and quickly decreased at temperatures higher than 150° C., and then, was dropped to 0 G at about 200° C. (Curie temperature). The magnetization of bias layer 4 exhibiting 250 G at room temperature was decreased in a laser beam irradiated area, and then, exhibited an inverted U-shaped distribution, as shown in FIG. 7. Bias magnetic field $H_B(T)$ from bias layer 4 was constantly directed upward. In Example 2, recording, erasing, and overwrite were successfully performed by applying a proper external magnetic field on the medium in the opposite direction of Example 1.

What is claimed is:

1. A magneto-optical information recording medium, comprising:

a recording layer for recording information having an easy axis of magnetization extending in a direction perpendicular to a surface thereof, a magnetization reversal first temperature range in which said recording layer has a corresponding first coercive force range, a compensation temperature below said first temperature range, a magnetization reversal second temperature range below said compensation temperature and in which said recording layer has a corresponding second coercive force range; and a bias layer having an initial uniform magnetization direction, situated above said recording layer, and for applying a temperature dependent bias magnetic field at a first recording region of said recording layer by heating a first bias region which opposes said first recording region, wherein a vector sum magnitude of a vector sum of said bias magnetic field and a static external magnetic field applied to said first recording region has a higher magnetic field value than a coercive force of said recording layer for temperatures in said second temperature range and lower values for temperature below said second temperature range;

wherein said first bias region of said bias layer, when heated to one of said first and second temperature ranges and then cooled to near room temperature, has said initial magnetization direction, wherein:

a) said first recording region has a coercive force which is less than said vector sum magnitude for temperatures in said first temperature range and said second temperature range, and b) a magnetization direction of said first recording region is aligned with the direction of said vector sum when said first recording region and said first bias region are at temperatures in said second range, and said magnetization direction does not change upon cooling of said first recording region to room temperature, c) a magnetization direction of said first recording region is aligned with the direction of said vector sum when said first recording region and said first bias region are at temperatures in said first temperature range, and said magnetization direction of said first recording region reverses upon cooling of said first recording region to room temperature.

2. A medium according to claim 1, further comprising:

a nonmagnetic layer between the bias and recording layers.

3. A medium according to claim 2, wherein:

said nonmagnetic layer is between 50 and 4000 angstroms thick.

4. A medium according to claim 1, wherein:
said external magnetic field has a magnitude of less than several hundred oersted.

5. A medium according to claim 1, wherein:
said external magnetic field has a magnitude of zero.

6. A medium according to claim 1, wherein:
said recording layer comprises a rare earth-transition metal alloy.

7. A medium according to claim 1, wherein:
said bias layer provides essentially no magnetic field to said recording layer when said bias layer is at room temperature.

8. A medium according to claim 1, wherein:
said bias layer is between 500 and 5000 angstroms thick.

9. A medium according to claim 1, wherein:
said recording layer is between 100 and 500 angstroms thick.

10. A method for recording and erasing information on a magneto-optical information recording medium, said medium comprising
a recording layer for recording information having an easy axis of magnetization extending in a direction perpendicular to a surface thereof, a magnetization reversal first temperature range in which said recording layer has a corresponding first coercive force range, a compensation temperature below said first temperature range, a magnetization reversal second temperature range below said compensation temperature and in which said recording layer has a corresponding second coercive force range; and
a bias layer having an initial uniform magnetization direction situated above said recording layer, for applying a temperature dependent bias magnetic field at a first recording region of said recording layer by heating a first bias region opposing said first recording region, wherein a vector sum magnitude of a vector sum of said bias magnetic field and a static external magnetic field applied to said first recording region has a higher magnetic field value than a coercive force of said recording layer for temperatures in said second magnetization temperature reversal range and a lower values for temperature below said second temperature range;
wherein said first bias region has said initial magnetization direction after being heated to one of said first and second temperature ranges and then cooled to near room temperature, wherein said first recording region has a coercive force which is less than said vector sum magnitude for temperatures in said first temperature range and said second temperature range,
comprising the steps of:
irradiating a first area of said medium comprising said first recording region and said first bias region with a laser beam, thereby heating at least a part of said first area to said second temperature range, thereby aligning a magnetization direction of said first recording region with the direction of said vector sum, wherein said magnetization direction does not change upon cooling of said first recording region to room temperature,
irradiating said first area with said laser beam, thereby heating at least a part of said first area to said first temperature range, thereby aligning a magnetization direction of said first recording region with the direction of said vector sum, wherein said magnetization direction of said first recording region reverses upon cooling of said first recording region to room temperature.

11. A magneto-optical information recording medium, comprising:
a recording layer for recording information, having an easy axis of magnetization extending in a direction perpendicular to a surface thereof, and having a compensation temperature, and first and second magnetization reversal temperature regions; and
a bias layer for applying a bias magnetic field having an intensity increasing as the temperature of a heated region of the bias layer increases up to said second magnetization temperature reversal region, to said recording layer, the magnetization direction of said bias layer remains unchanged with respect to an initial magnetization direction of said bias layer when the medium is cooled to near room temperature during recording and erasing on said medium;
wherein:
a) the magnetization direction of said recording layer is inverted upon application of said bias magnetic field having a reversed direction from the initial direction from said bias layer to said recording layer when said recording medium is heated to said first and second magnetization reversal temperature regions during said recording and erasing,
b) the direction of magnetization of said recording layer is thus oriented in a same direction as that of said bias magnetic field at temperatures of said first and second magnetization reversal temperature regions,
c) the magnetization direction of said recording layer is then inverted when said recording layer is cooled from said first and second magnetization reversal temperature regions to near said room temperature,
d) the magnetization direction of said recording layer, when said medium is cooled form said second magnetization reversal temperature region to said room temperature, is opposite the magnetization direction of said recording layer when the medium is cooled from said first magnetization reversal temperature region to below the compensation temperature of said recording layer,
wherein the first reversal temperature region is higher than the second reversal temperature region, the second reversal temperature region is higher than room temperature, the compensation temperature of the recording layer is higher than the second reversal temperature and lower than the first reversal temperature.

12. A magneto-optical information recording medium, comprising:
a recording layer for recording information, having an easy axis of magnetization extending in a first direction, a magnetization reversal first temperature range in which the recording layer has a correspond first coercive force range, and a magnetization reversal second temperature range below said first temperature range in which said recording layer has a corresponding second coercive force range; and
a bias layer having an initial uniform magnetization direction, situated above said recording layer, and for applying a temperature dependent bias magnetic field at a first recording region of said recording layer by heating a first bias region which opposes said first recording region, wherein a vector sum magnitude of a vector sum of said bias magnetic field and a static external magnetic field applied to said first recording region has a higher magnetic field value than a coercive force of said recording layer for temperatures in said second temperature range and lower values for temperatures below said second temperature range;

wherein said first bias region of said bias layer, when heated to one of said first and second temperature ranges and then cooled to near room temperature, has said initial magnetization direction, wherein:

a) said first recording region has a coercive force which is less than said vector sum for temperatures in said first temperature range and said second temperature range, and b) a magnetization of said first recording region is aligned with the direction of said vector sum when said first recording region in said first bias region is heated to temperatures in said second range, and said magnetization direction does not change upon cooling of said first recording region to room temperature, c) a magnetization direction of said first recording region is aligned with the direction of said vector sum when said first recording region and said first bias region is heated to temperatures in said first temperature range, and said magnetization direction of said first recording region does not change upon cooling of said first recording region to room temperature, and d) said magnetization direction of said first recording region, when said bias region is in said first temperature range, is different than when said bias region is in said second temperature range.

* * * * *